3,232,967
16,21-DIHYDROXY-4,17(20)-PREGNADIENE-3,11-
DIONE AND PROCESS FOR PRODUCTION
THEREOF
Barney J. Magerlein and William P. Schneider, Kalamazoo, Mich., assignors to The Upjohn Company, Kalamazoo, Mich., a corporation of Michigan
No Drawing. Filed Nov. 26, 1958, Ser. No. 776,437
14 Claims. (Cl. 260—397.45)

This invention relates to 16-oxygenated compounds of the pregnane series and is more particularly concerned with 16,21-dihydroxy-4,17(20)-pregnadiene-3,11-dione, 11β,16,21-trihydroxy-4,17(20)-pregnadien-3-one, the 21-acylates thereof, the 16,21-diacylates thereof, and to processes for the production thereof.

The novel products of the present invention are represented by the following formula:

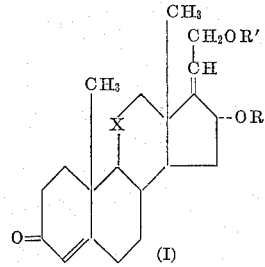

wherein X is the carbonyl radical (>C=O) or the β-hydroxymethylene radical

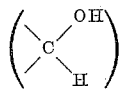

R and R' are selected from the group consisting of hydrogen and the acyl radical of an organic carboxylic acid, preferably a hydrocarbon carboxylic acid containing from 1 to 12 carbon atoms, inclusive, and wherein R is acyl, R' is also acyl.

In this application it is to be understood that the substituent at the 16-position has the α-configuration.

The novel compounds of this invention represented by Formula I possess central nervous system depressant activity manifested by sedative and hypnotic activity and in addition potentiate the sleep-producing activity of hexobarbitol. These compounds are useful in the treatment of neurosis as manifested by hypertension, anxiety, etc., in psychotic conditions where tranquilization is desirable and in related disorders.

The compounds of this invention can be prepared and administered to the animal organism in a wide variety of oral dosage forms singly, or in admixture with other co-acting compounds. They can be associated with a carrier which can be a solid material or a liquid in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups, or elixirs.

The process of the present invention comprises treating an 11β-hydroxy-21-acyloxy-4,17(20)-pregnadien-3-one or a 21-acyloxy-4,17(20)-pregnadiene-3-11-dione with selenium dioxide to selectively produce the corresponding 11-oxygenated 16-hydroxy-21-acyloxy-4,17(20)-pregnadien-3-one. The 11-oxygenated 16-hydroxy-21-acyloxy-4,17(20)-pregnadien-3-one thus produced can be esterified at the 16-position according to procedures well known in the art for 21-esterifying hydrocortisone to yield the corresponding 11-oxygenated-16,21-diacyloxy-4,17(20)-pregnadien-3-one. The 11-oxygenated 16-hydroxy-21-acyloxy-4,17(20)-pregnadien-3-one can be saponified by methods known to saponify hydrocortisone 21-acetate to give the corresponding 11-oxygenated 16,21-dihydroxy-4-17(20)-pregnadien-3-one.

The starting materials for this invention can be prepared according to the procedure disclosed in U.S. Patent 2,774,776. 11β,21-dihydroxy-4,17(20)-pregnadien-3-one or 21-hydroxy-4,17(20)-pregnadiene-3,11-dione can be acylated at the 21-position by reaction with an acylating agent, such as, for example, an acid anhydride, acid chloride, or a ketone of an organic carboxylic acid, particularly a hydrocarbon carboxylic acid containing from one to twelve carbon atoms, inclusive, such as, for example, an aliphatic acid, acetic, propionic butyric, valeric, hexanoic, lauric, trimethylacetic, isobutyric, isovaleric, tertiary butylacetic, a cycloaliphatic acid, e.g., β-cyclopentylpropionic, cyclohexanecarboxylic, cyclohexylacetic, an alkaryl acid, e.g., benzoic, phenylacetic, β-phenylpropionic, o-, m-, and p-toluic, a saturated dibasic acid (which can be converted into water soluble, e.g., sodium, salts), e.g., succinic, adipic, a monobasic unsaturated acid, e.g., acrylic, crotonic, undecylenic, propiolic, 2-butynoic, undecolic, cinnamic, dibasic unsaturated acids (which can be converted into water soluble, e.g., sodium, salts) e.g., maleic and citraconic, and the like. The 21-formate ester of 11β,21-dihydroxy-4,17(20)-pregnadien-3-one and the 21-formate ester of 21-hydroxy-4,17(20)-pregnadiene-3,11-dione are conveniently prepared by reacting 11β,21-dihydroxy-4,17(20)-pregnadien-3-one and 21-hydroxy-4,17(20)-pregnadiene-3,11-dione, respectively with formic acid. Illustrative of the starting materials thus produced are 11β-hydroxy-21-acetoxy-4,17(20)-pregnadien-3-one, 11β-hydroxy-21-propionyloxy-4,17(20)-pregnadien-3-one, 11β-hydroxy-21-benzoyloxy-4,17(20)-pregnadien-3-one, 11β-hydroxy-21-(β-phenylpropionyloxy)-4,17(20)-pregnadien-3-one, 11β-hydroxy-21-hemisuccinoyloxy-4,17(20)-pregnadien-3-one, 11β-hydroxy-21-crotonyloxy-4,17(20)-pregnadien-3-one, 11β-hydroxy-21-maleyloxy-4,17(20)-pregnadien-3-one, the corresponding esters of 21-hydroxy-4,17(20)-pregnadiene-3-11-dione, and the like.

In carrying out the process of this invention the selected 11β-hydroxy-21-acyloxy-4,17(20)-pregnadien-3-one or the selected 21-acyloxy-4,17(20)-pregnadiene-3,11-dione is contacted with selenium dioxide in a suitable solvent to selectively produce the corresponding 11β,16-dihydroxy-21-acyloxy-4,17(20)-pregnadien-3-one and the corresponding 16-hydroxy 21-acyloxy-4,17(20)-pregnadiene-3,11-dione, respectively. The reaction is usually conducted at between room temperature (25° C.) and the boiling point of the reaction mixture, although temperatures from about minus 10 to 100° C. are operative.

The time of reaction is limited in order to obtain maximum yields of the 16-hydroxy compound. Prolonged reaction time will produce substantial quantities of the corresponding 1-dehydro-16-hydroxy compound thereby giving proportionally lower yields of the desired 11-oxygenated - 16 - hydroxy - 21 - acyloxy - 4,17(20) - pregnadiene-3-one. The 1-dehydro-16-hydroxy compounds, i.e., the 11 - oxygenated-16-hydroxy-1,4,17(20) - pregnatriene compounds corresponding otherwise to Formula I, above, for example, 11β,16,21-trihydroxy-1,4,17(20)-pregnatriene-3-one 21-acetate and 16,21-dihydroxy-1,4,17(20)-pregnatriene-3,11-dione 21-acetate can be separated by fractional crystallization, chromatography, or the like. They possess the same properties as those compounds of Formula I.

Completion of the reaction can take from 15 minutes to 48 hours, depending in part on the temperature employed and the selected solvent. Suitable solvents include, for example, dioxane, acetic acid, acetic anhydride, tertiary butyl alcohol, ethyl acetate, mixtures of these, aqueous mixtures of these solvents, and the like. The preferred solvent is a mixture of dioxane and water. The 11β,16-dihydroxy-21-acyloxy-4,17(20)-pregnadien-3-one or 16-hydroxy-21-acyloxy-4,17(20)-pregnadiene-3,11-dione, thus obtained, is recovered from the reaction mixture and purified by conventional methods, such as, for example, dilution of the reaction mixture with water and extraction with a water-immiscible solvent, such as, methylene chloride, ethyl acetate, benzene, toluene and the like, followed by chromatography and recrystallization.

The thus-obtained 11β,16-dihydroxy-21-acyloxy-4,17-(20)-pregnadien-3-one or 16-hydroxy-21-acyloxy-4,17-(20)-pregnadiene-3,11-dione can be converted to the corresponding 11β-hydroxy-16,21-diacyloxy-4,17(20)-pregnadiene-3,20-dione and the corresponding 16,21-diacyloxy-4,17(20)-pregnadiene-3,11-dione, respectively, using acylating conditions conventionally used for producing 21-esters from steroid 21-alcohols such as hydrocortisone. Suitable acylating agents are organic carboxylic acids, particularly hydrocarbon carboxylic acids containing from 1 to 12 carbon atoms, inclusive, for example, those acids previously listed, or the acid anhydrides or acid halides thereof. If the acylating agent is the free acid, the reaction is preferably effected in the presence of an esterification catalyst, for example, p-toluenesulfonic acid, trifluoroacetic acid, sulfuric acid, and the like.

The 11-oxygenated 16-hydroxy-21-acyloxy-4,17(20)-pregnadien-3-ones can be hydrolyzed to the corresponding 11-oxygenated 16,21-dihydroxy-4,17(20)-pregnadien-3-one, i.e., 11β,16,21-trihydroxy-4,17(20)-pregnadiene-3-one and 16,21-dihydroxy-4,17(20)-pregnadiene-3,11-dione, in accordance with known methods for hydrolyzing hydrocortisone 21-esters to the hydrocortisone 21-alcohol. A preferred procedure is to employ at least a molar equivalent of an alkali metal bicarbonate in a substantially oxygen-free solution of a mixture of a lower alkanol and water. The hydrolysis reaction is carried out at a temperature between 10° and 30° C. while protecting the mixture from atmospheric oxygen. After the hydrolysis is complete, the reaction mixture is neutralized with an acid, e.g. acetic acid, and the hydrolyzed product recovered from the reaction mixture by evaporation and crystallization, extraction with methylene chloride, or the like.

The 11-oxygenated 16,21-diacyloxy-4,17(20)-pregnadien-3-ones can be saponified in the same manner as described above to yield the corresponding 11-oxygenated 16,21-dihydroxy-4,17(20)-pregnadien-3-one.

The 11-oxygenated 16,21-dihydroxy-4,17(20)-pregnadien-3-ones can be esterified using conventional 21-acylating conditions, as disclosed above, to give the corresponding 11-oxygenated 16,21-diacyloxy-4,17(20)-pregnadien-3-ones.

The following examples are illustrative of the process and products of the present invention, but are not to be construed as limiting.

*Example 1.—11β,16-dihydroxy-21-acetoxy-4,17(20)-pregnadien-3-one*

A mixture of 3.7 g. of 11β-hydroxy-21-acetoxy-4,17-(20)-pregnadien-3-one and 1.10 g. of selenium dioxide in 55 ml. of dioxane and 15 ml. of water was heated under reflux for one hour. The solution was filtered to remove the selenium. The filtrate was diluted with water and extracted with methylene chloride. The methylene chloride extracts were combined and concentrated by distillation giving 4.54 g. of a yellow oil. The oil, thus-obtained, was dissolved in ethyl acetate and crystallized yielding 2 g. of 11β,16α-dihydroxy-21-acetoxy-4,17(20)-pregnadien-3-one melting at 172 to 177° C. An analytical sample was prepared by chromatography over alumina (aluminum oxide) followed by recrystallization from ethyl acetate. The analytical sample melted at 179.5 to 181° C.

*Anal.*—Calculated for $C_{23}H_{32}O_5$: C, 71.10; H, 8.30. Found: C, 71.10; H, 8.14.

In the same manner as described above and substituting other 21-acylates of 11β,21-dihydroxy-4,17(20)-pregnadien-3-one in place of 11β-hydroxy-21-acetoxy-4,17(20)-pregnadien-3-one the above preparation is productive of other 21-acylates of 11β,16α,21-trihydroxy-4,17(20)-pregnadien-3-one, such as, for example, 11β,16-dihydroxy-21-formyloxy-4,17(20)-pregnadien-3-one, 11β,16-dihydroxy-21-propionyloxy-4,17(20)-pregnadien-3-one, 11β,16-dihydroxy-21-butyryloxy-4,17(20)-pregnadien-3-one, 11β,16-dihydroxy-21-hexanoyloxy-4,17(20)-pregnadien-3-one, 11β,16-dihydroxy-21-trimethylacetoxy-4,17(20)-pregnadien-3-one, 11β,16-dihydroxy-21-isovaleryloxy-4,17(20)-pregnadien-3-one, 11β,16-dihydroxy-21-tertiary-butylacetoxy-4,17(20)-pregnadien-3-one, 11β,16-dihydroxy-21-cyclohexylacetoxy-4,17(20)-pregnadien-3-one, 11β,16-dihydroxy-21-benzoyloxy-4,17(20)-pregnadien-3-one, 11β,16-dihydroxy-21-hemisuccinoyloxy-4,17(20)-pregnadien-3-one, 11β,16-dihydroxy-21-hemiadipyloxy-4,17(20)-pregnadien-3-one, 11β,16-dihydroxy-21-acrylyloxy-4,17(20)-pregnadien-3-one, 11β,16-dihydroxy-21-undecolyloxy-4,17(20)-pregnadien-3-one, 11β,16-dihydroxy-21-maleyloxy-4,17(20)-pregnadien-3-one, and the like.

*Example 2.—11β-hydroxy-16,21-diacetoxy-4,17(20)-pregnadien-3-one*

A solution of 500 mg. of 11β,16-dihydroxy-21-acetoxy-4,17(20)-pregnadien-3-one in 1 ml. of pyridine and 1.0 ml. of acetic anhydride was allowed to stand for three hours at about 25° C. The solution was then diluted with water and the resulting oil which separated from solution was extracted with methylene chloride. The combined extracts were washed with dilute hydrochloric acid and then with sodium bicarbonate. The methylene chloride extract was then dried over sodium sulfate and chromatographed on a synthetic magnesium silicate column. The column was eluted with a 6% acetone in Skellysolve B hexanes solution giving 480 mg. of 11β-hydroxy-16α,21-diacetoxy-4,17(20)-pregnadien-3-one as an oil, having an ultraviolet absorption maximum of 253 mμ, and infrared absorption maxima at 3598, 2922, 1732, 1668, and 1620 cm.$^{-1}$ in methylene chloride solution.

In the same manner using 11β,16-dihydroxy-21-acetoxy-4,17(20)-pregnadien-3-one as starting material or substituting in place thereof other 11β,16-dihydroxy-21-acyloxy-4,17(20)-pregnadien-3-ones, wherein the acyl radical contains from one to twelve carbon atoms, inclusive, such as, for example, those compounds prepared in Example 1, other 11β-hydroxy-16α,21-diacyloxy-4,17-(20)-pregnadien-3-ones can be prepared by allowing the selected 11β,16-dihydroxy-21-acyloxy-4,17(20)-pregnadiene-3-one to react with the selected hydrocarbon carboxylic acid, such as, for example, one of the acids previously listed, or with the acid anhydride or acid halide thereof.

Illustrative of 16α,21-diacylates thus produced are

11β-hydroxy-16,21-diformyloxy-4,17(20)-pregnadien-3-one,

11β-hydroxy-16,21-dipropionyloxy-4,17(20)-pregnadien-3-one,

11β-hydroxy-16,21-dibutryloxy-4,17(20)-pregnadien-3-one,
11β-hydroxy-16,21-ditrimethylacetoxy-4,17(20)-pregnadien-3-one,
11β-hydroxy-16,21-dicyclohexylacetoxy-4,17(20)-pregnadien-3-one,
11β-hydroxy-16,21-dibenzoyloxy-4,17(20)-pregnadien-3-one,
11β-hydroxy-16,21-dihemisuccinoyloxy-4,17(20)-pregnadien-3-one,
11β-hydroxy-16,21-diacryiyloxy-4,17(20)-pregnadien-3-one,
11β-hydroxy-16,21-dimaleyloxy-4,17(20)-pregnadien-3-one,
11β-hydroxy-16-formyloxy-21-acetoxy-4,17(20)-pregnadien-3-one,
11β-hydroxy-16-acetoxy-21-propionyloxy-4,17(20)-pregnadien-3-one,
11β-hydroxy-16-propionyloxy-21-acetoxy-4,17(20)-pregnadien-3-one,
11β-hydroxy-16-propionyloxy-21-butyryloxy-4,17(20)-pregnadien-3-one,
11β-hydroxy-16-hexanoyloxy-21-trimethylacetoxy-4,17(20)-pregnadien-3-one,
11β-hydroxy-16-isovaleryloxy-21-tertiary-butylacetoxy-4,17(20)-pregnadien-3-one
11β-hydroxy-16-cyclohexylacetoxy-21-benzoyloxy-4,17(20)-pregnadien-3-one,
11β-hydroxy-16-benzoyloxy-21-hemisuccinoyloxy-4,17(20)-pregnadien-3-one,
11β-hydroxy-16-hemiadipyloxy-21-acrylyloxy-4,17(20)-pregnadien-3-one,
11β-hydroxy-16-undecolyloxy-21-maleyloxy-4,17(20)-pregnadien-3-one, and the like.

If the corresponding acylating agent is solid, an inert solvent such as toluene, xylene, or dioxane can be added to effect solution and to provide a liquid esterification medium. If the esterifying agent is the free acid, the reaction is carried out in the presence of an esterification catalyst.

*Example 3.—11β,16,21-trihydroxy-4,17(20)-pregnadien-3-one*

A solution of 200 mg. of 11β,16-dihydroxy-21-acetoxy-4,17(20)-pregnadien-3-one in 20 ml. of methanol in a nitrogen atmosphere was treated with a solution of 100 mg. of potassium bicarbonate in 2 ml. of water. The mixture was stirred at room temperature (about 25° C.) for a period of five hours. The solution was then neutralized by the addition of 0.5 ml. of acetic acid followed by the addition of 12 ml. of water. The resulting solution was concentrated to about 5 ml. by distillation at reduced pressure. The resulting concentrate was extracted with methylene chloride; the extracts were washed with aqueous sodium bicarbonate solution and water and dried over sodium sulfate. The dried methylene chloride solution was chromatographed over 20 g. of Florisil synthetic magnesium silicate to give 120 mg. of 11β,16α,21-trihydroxy-4,17(20)-pregnadien-3-one having an ultraviolet absorption maxima of 242 mμ. Infrared absorption maxima showed the presence of hydroxyl, conjugated ketone and double bond groups in the molecule, thereby confirming the structure.

*Example 4.—16-hydroxy-21-acetoxy-4,17(20)-pregnadiene-3,11-dione*

A mixture of 14.5 g. of 21-acetoxy-4,17(20)-pregnadiene-3,11-dione, 215 ml. of dioxane, 50 ml. of water and 4 g. of selenium dioxide was heated under reflux for one hour. After cooling the reaction mixture to 26° C., 5.5 g. of Magnesol synthetic magnesium silicate was added and the mixture was stirred for 20 minutes. The solids were removed by filtration and the filtrate was diluted with 1 l. of methylene dichloride. The organic solution was washed with water six times. Raney nickel, previously washed with methyl alcohol, was added to the solution and the mixture was stirred for 20 minutes. After filtering through Filter-Cel diatomaceous earth, the solution was dried over sodium sulfate. The solution was then concentrated to dryness and the crude product was recrystallized from ethyl acetate to give crystals of 16-hydroxy - 21 - acetoxy-4,17(20)-pregnadiene-3,11-dione melting at 233 to 236° C. and weighing 6.9 g. An analytical sample was prepared by recrystallization from ethyl acetate to give 16α-hydroxy-21-acetoxy-4,17(20)-pregnadiene-3,11-dione melting at 245 to 246° C., [α]$_D$ +145° (chloroform).

*Anal.*—Calculated for $C_{23}H_{30}O_5$: C, 71.48; H, 7.82. Found: C, 71.23; H, 7.53.

In the same manner as described above and substituting other 21-acylates of 21-hydroxy-4,17(20)-pregnadiene-3,11-dione in place of 21-acetoxy-4,17(20)-pregnadiene-3,11-dione the above preparation is productive of other 21 - acylates of 16α,21-dihydroxy-4,17(20)-pregnadiene-3-11-dione, such as, for example, 16-hydroxy-21-formyloxy-4,17(20)-pregnadiene-3,11-dione,
16-hydroxy-21-propionyloxy-4,17(20)-pregnadiene-3,11-dione,
16-hydroxy-21-butyryloxy-4,17(20)-pregnadiene-3,11-dione,
16-hydroxy-21-hexanoyloxy-4,17(20)-pregnadiene-3,11-dione,
16-hydroxy-21-trimethylacetoxy-4,17(20)-pregnadiene-3,11-dione,
16-hydroxy-21-isovaleryloxy-4,17(20)-pregnadiene-3,11-dione,
16-hydroxy-21-tertiary-butylacetoxy-4,17(20)-pregnadiene-3,11-dione,
16-hydroxy-21-cyclohexylacetoxy-4,17(20)-pregnadiene-3,11-dione,
16-hydroxy-21-benzoyloxy-4,17(20)-pregnadiene-3,11-dione,
16-hydroxy-21-hemisuccinoyloxy-4,17(20)-pregnadiene-3,11-dione,
16-hydroxy-21-hemiadipyloxy-4,17(20)-pregnadiene-3,11-dione,
16-hydroxy-21-acrylyloxy-4,17(20)-pregnadiene-3,11-dione,
16-hydroxy-21-undecolyloxy-4,17(20)-pregnadiene-3,11-dione,
16-hydroxy-21-maleyloxy-4,17(20)-pregnadiene-3,11-dione, and the like.

*Example 5.—16,21-diacetoxy-4,17(20)-pregnadiene-3,11-dione*

Following the procedure of Example 2, but substituting as starting material therein 16-hydroxy-21-acetoxy-4,17-(20)-pregnadiene - 3,11 - dione for 11β,16-dihydroxy-21-acetoxy - 4,17(20) - pregnadien-3-one is productive of 16α,21-diacetoxy-4,17(20)-pregnadiene-3,11-dione.

In the same manner using 16-hydroxy-21-acetoxy-4,17(20)-pregnadiene-3,11-dione as starting material or substituting in place thereof other 16-hydroxy-21-acyloxy-4,17(20)-pregnadiene-3,11-diones, wherein the acyl radical contains from 1 to 12 carbon atoms, inclusive, such as, for example, those compounds prepared in Example 4, other 16α,21-diacyloxy-4,17(20)-pregnadiene-3,11-diones can be prepared by allowing the selected 16-hydroxy-21-acyloxy-4,17(20)-pregnadiene-3,11-dione to react with the selected hydrocarbon carboxylic acid, such as, for example, one of the acids previously listed, or with the acid anhydride or acid halide thereof.

Illustrative of 16α,21-diacylates thus produced are 16,21-diformyloxy-4,17(20) - pregnadiene - 3,11 - dione, 16,21-dipropionyloxy-4,17(20) - pregnadiene - 3,11-dione, 16,21-dibutryloxy - 4,17(20) - pregnadiene - 3,11 - dione, 16,21-ditrimethylacetoxy-4,17(20)-pregnadiene-3,11 - dione, 16,21-dicyclohexylacetoxy - 4,17(20) - pregnadiene- 3,11-dione, 16,21-dibenzoyloxy - 4,17(20) - pregnadiene-3,11-dione, 16,21-dihemisuccinoyloxy-4,17(20) - pregnadiene-3,11-dione, 16,21-diacrylyloxy-4,17(20)-pregnadiene-3,11-dione, 16,21-dimaleyloxy-4,17(20)-pregnadiene-3,11-dione, 16-formyloxy-21-acetoxy - 4,17(20) - pregnadiene-3,11-dione, 16-acetoxy-21-propionyloxy - 4,17(20)-pregnadiene-3,11-dione, 16 - propionyloxy - 21 - acetoxy-4,17(20)-pregnadiene-3,11 - dione, 16-propionyloxy - 21-butyryloxy-4,17(20)-pregnadiene - 3,11 - dione, 16-hexanoyloxy - 21 - trimethylacetoxy - 4,17(20) - pregnadiene-3,11-dione, 16 - isovaleryloxy - 21 - tertiarybutylacetoxy-4,17(20)-pregnadiene-3,11-dione, 16 - cyclohexylacetoxy-21-benzoyloxy - 4,17(20) - pregnadiene - 3,11 -dione, 16-benzoyloxy-21-hemisuccinoyloxy - 4,17(20)-pregnadiene-3,11-dione, 16-hemiadipyloxy-21 - acryloxy - 4,17(20)-pregnadiene-3,11-dione, 16-undecolyloxy-21 - maleyloxy-4,17(20)-pregnadiene-3,11-dione, and the like.

If the corresponding acylating agent is solid, an inert solvent such as toluene, xylene, or dioxane can be added to effect solution and to provide a liquid esterification medium. If the esterifying agent is the free acid, the reaction is carried out in the presence of an esterification catalyst.

*Example 6.—16,21-dihydroxy-4,17(20)-pregnadiene-3,11-dione*

Following the procedure of Example 3, but substituting as starting material therein 16-hydroxy-21-acetoxy-4,17(20)-pregnadiene-3,11-dione for 11β,16 - dihydroxy-21-acetoxy-4,17(20) - prenadien-3-one is productive of 16α,21-dihydroxy-4,17(20)-pregnadiene-3,11-dione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound of the following formula:

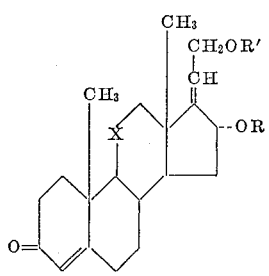

wherein X is selected from the group consisting of the carbonyl radical and the β-hydroxymethylene radical, R and R' are selected from the group consisting of hydrogen and the acyl radical of a hydrocarbon carboxylic acid containing from 1 to 12 carbon atoms, inclusive, and wherein, when R is acyl, R' is acyl.

2. 11β,16α,21 - trihydroxy-1,4,17(20) - pregnatrien-3-one 21-acylate wherein the acyl radical is that of a hydrocarbon carboxylic acid containing from 1 to 12 carbon atoms, inclusive.

3. 11β,16α,21-trihydroxy-4,17(20)-pregnadien-3-one.

4. 11β,16α - dihydroxy - 21-acetoxy-4,17(20) - pregdien-3-one.

5. 11β - hydroxy - 16α,21-diacetoxy - 4,17(20)-pregnadien-3-one.

6. 16α,21-dihydroxy - 1,4,17(20) - pregnatriene-3,11-dione 21-acylate, wherein the acyl radical is that of a hydrocarbon carboxylic acid containing from 1 to 12 carbon atoms, inclusive.

7. 16α,21-dihydroxy - 4,17(20)-pregnadiene-3,11-dione.

8. 16α-hydroxy-21-acetoxy-4,17(20)-pregnadiene-3,11-dione.

9. 16α,21-diacetoxy-4,17(20)-pregnadiene-3,11-dione.

10. The process which comprises reacting an 11-oxygenated 21-acyloxy-4,17(20)-pregnadien-3-one of the following formula:

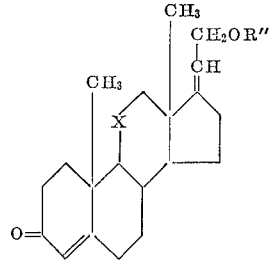

wherein X is selected from the group consisting of the carbonyl radical and the β-hydroxymethylene radical, and R″ is the acyl radical of an organic carboxylic acid containing from 1 to 12 carbon atoms, inclusive, with selenium dioxide to produce the corresponding 16α-hydroxy compound.

11. The process which comprises reacting 11β-hydroxy-21-acyloxy-4,17(20)-pregnadien-3-one, wherein acyl is the acyl radical of an organic carboxylic acid containing from 1 to 12 carbon atoms, inclusive, with selenium dioxide to produce the corresponding 11β,16α-dihydroxy-21-acyloxy-4,17(20)-pregnadien-3-one.

12. The process which comprises reacting 11β-hydroxy-21-acetoxy-4,17(20)-pregnadien-3-one with selenium dioxide to produce 11β,16α-dihydroxy-21-acetoxy-4,17(20)-pregnadien-3-one.

13. The process which comprises reacting 21-acyloxy-4,17(20)-pregnadiene-3,11-dione, wherein acyl is the acyl radical of an organic carboxylic acid containing from 1 to 12 carbon atoms, inclusive, with selenium dioxide to produce the corresponding 16α-hydroxy-21 - acyloxy-4,17(20)-pregnadiene-3,11-dione.

14. The process which comprises reacting 21-acetoxy-4,17(20)-pregnadiene-3,11-dione, with selenium dioxide to produce 16α-hydroxy - 21-acetoxy-4,17(20) - pregnadiene-3,11-dione.

References Cited by the Examiner
UNITED STATES PATENTS
2,774,776  12/1956  Hogg _____ 260—397.1

LEWIS GOTTS, *Primary Examiner.*

B. E. LANHAM, L. H. GASTON, *Examiners.*

B. G. COLLEY, P. O'DAY, HENRY A. FRENCH,
*Assistant Examiners.*